US012739520B1

(12) United States Patent
Matsuzaki et al.

(10) Patent No.: US 12,739,520 B1
(45) Date of Patent: Sep. 15, 2026

(54) IMAGE PROCESSING DEVICE, IMAGE PROCESSING METHOD, AND COMPUTER PROGRAM

(71) Applicant: EIZO Corporation, Hakusan (JP)

(72) Inventors: Hiroki Matsuzaki, Hakusan (JP); Takumi Inoue, Hakusan (JP); Hiroya Saito, Hakusan (JP); Harutaka Takebe, Hakusan (JP)

(73) Assignee: EIZO Corporation, Hakusan (JP)

( * ) Notice: Subject to any disclaimer, the term of this patent is extended or adjusted under 35 U.S.C. 154(b) by 74 days.

(21) Appl. No.: 18/866,695

(22) PCT Filed: Jun. 23, 2022

(86) PCT No.: PCT/JP2022/025107

§ 371 (c)(1),
(2) Date: Nov. 18, 2024

(87) PCT Pub. No.: WO2023/248429

PCT Pub. Date: Dec. 28, 2023

(51) Int. Cl.
*H04N 23/745* (2023.01)
*H04N 23/73* (2023.01)

(52) U.S. Cl.
CPC ........... *H04N 23/745* (2023.01); *H04N 23/73* (2023.01)

(58) Field of Classification Search
CPC .. H04N 23/745; H04N 23/73; G09G 2340/16; G09G 3/3611; G09G 2320/0252;
(Continued)

(56) References Cited

U.S. PATENT DOCUMENTS 8,675,029 B2 * 3/2014 Benjamin ............ G09G 3/3648 345/87
2002/0024481 A1 * 2/2002 Kawabe ............... G09G 3/3611 345/87

(Continued)

FOREIGN PATENT DOCUMENTS

JP 2004045919 A 2/2004
JP 2004226841 A 8/2004

(Continued)

OTHER PUBLICATIONS

International Search Report issued on Sep. 13, 2022, in corresponding International Application No. PCT/JP2022/025107; 4 pages.

(Continued)

*Primary Examiner* — Ahmed A Berhan
(74) *Attorney, Agent, or Firm* — Maier & Maier, PLLC

(57) ABSTRACT

An image processing device that performs a correction processing to correct a second frame based on a first frame and the second frame, comprising: a flicker component estimation unit; and a pixel value correction unit. The flicker component estimation unit is configured to obtain a flicker component value based on pixel values of in-region pixels in the first and second frames, the in-region pixels are composed of a plurality of pixels included in a predetermined region in the first and second frames, the plurality of pixels include an attention pixel and a surrounding pixel arranged around the attention pixel, the flicker component value corresponds to a degree of flicker occurring in an image display unit due to a pixel response delay in the in-region pixels when the first frame transits to the second frame.

10 Claims, 8 Drawing Sheets

(58) Field of Classification Search
CPC ............. G09G 2320/0247; G09G 3/36; G09G 2320/02
See application file for complete search history.

(56) References Cited

U.S. PATENT DOCUMENTS

| | | | | |
|---|---|---|---|---|
| 2004/0145596 | A1* | 7/2004 | Yamakawa | G09G 3/3611 345/690 |
| 2007/0122061 | A1 | 5/2007 | Sakuta et al. | |
| 2007/0236432 | A1 | 10/2007 | Benjamin et al. | |
| 2011/0199287 | A1 | 8/2011 | Benjamin et al. | |

FOREIGN PATENT DOCUMENTS

| | | | |
|---|---|---|---|
| JP | 2010008871 | A | 1/2010 |
| JP | 2019101100 | A | 6/2019 |
| TW | 200535786 | A | 11/2005 |

OTHER PUBLICATIONS

Office Action issued on Jul. 5, 2024, in corresponding Taiwanese Application No. 112123083; 10 pages.
Office Action issued on May 30, 2023, in corresponding Japanese Application No. 2023-524670; 8 pages.

* cited by examiner

EMBODIMENT

Rg
FRAME
a1
a2
a2
a2
a2
a2
a2
a2
a2
a2

Rg
FRAME
a1
a2
a2
a2
a2
a2
a2
a2
a2
a2

IN-REGION PIXEL Rg OF
Nth FRAME (FIRST FRAME F1)
255
0
100
0
50
0
150
0
255
a1
a2(EACH OF EIGHT PIXELS
SURROUNDED BY DASHED LINE)

IN-REGION PIXEL Rg OF
N+1th FRAME (SECOND FRAME F2)
0
100
0
150
128
255
0
200
0
a1
a2(EACH OF EIGHT PIXELS
SURROUNDED BY DASHED LINE)

FIFTH MODIFICATION OF EMBODIMENT

IMAGE PROCESSING DEVICE, IMAGE PROCESSING METHOD, AND COMPUTER PROGRAM

TECHNICAL FIELD

The present invention relates to an image processing device, an image processing method, and a computer program.

BACKGROUND ART

When a frame displayed on an image display unit transitions, a pixel value (luminance) of each pixel changes according to a frame being displayed. Here, since a response speed of a pixel where a pixel value increases, differs from a response speed of a pixel where a pixel value decreases, flicker may occur on the image display unit when a frame transitions. In other words, since there is a pixel response delay between the pixel where the pixel value increases and the pixel where the pixel value decreases, the flicker may occur on the image display unit, leading to a decrease in image quality. Patent Literature 1 discloses a technology for suppressing the flicker by decreasing the response speed of the pixel where the pixel value decreases.

CITATION LIST

Patent Literature

[Patent Literature 1] US Patent Application Publication No. 2011/0199287

SUMMARY OF INVENTION

Technical Problem

The flicker is likely to occur when the frame displayed on the image display unit is, for example, a dot mesh frame where white and black pixels are arranged alternately. On the other hand, the image display unit may display a frame where the flicker is less likely to occur. One example is when a solid white frame (e.g., the pixel values of all pixels are maximum) transits to a solid black frame (e.g., the pixel values of all pixels are minimum). In this case, the pixel values of all pixels on the image display unit decrease when the frame transitions. In such a case, when the technology of Patent Literature 1 is applied uniformly to the frame, the response speed of all pixels on the image display unit will decrease, which in turn may degrade image quality.

The present invention has been made in consideration of the above circumstances, and aims to provide an image processing device, an image processing method, and a computer program that suppresses flicker and prevents image quality degradation due to a flicker suppression processing.

Solution to Problem

The present invention provides an image processing device that performs a correction processing to correct a second frame based on a first frame and the second frame, comprising: a flicker component estimation unit; and a pixel value correction unit, wherein the flicker component estimation unit is configured to obtain a flicker component value based on pixel values of in-region pixels in the first and second frames, the in-region pixels are composed of a plurality of pixels included in a predetermined region in the first and second frames, the plurality of pixels include an attention pixel and a surrounding pixel arranged around the attention pixel, the flicker component value corresponds to a degree of flicker occurring in an image display unit due to a pixel response delay in the in-region pixels when the first frame transits to the second frame, the pixel response delay corresponds to a difference in response speed between an increasing pixel where a pixel value increases and a decreasing pixel where a pixel value decreases among the plurality of pixels when the first frame transits to the second frame, the pixel value correction unit is configured to obtain a corrected pixel value based on the flicker component value, and the corrected pixel value is a value obtained by correcting the pixel value of the attention pixel in the second frame.

In the present invention, the pixel value correction unit is configured to obtain the corrected pixel value based on the flicker component value. Here, the flicker component value is based not only on the pixel value of the attention pixel in the first and second frames, but also on the pixel value of the surrounding pixel arranged around the attention pixel, and is a value that takes into account the content (type) of the first and second frames, so the corresponding corrected pixel value is also a value that takes into account the content of the first and second frames. As a result, when suppressing flicker, it is possible to prevent image quality from degrading depending on the content of the first and second frames.

Various embodiments of the present invention are described below. Any of the embodiments described below can be combined with one another.

(1) An image processing device that performs a correction processing to correct a second frame based on a first frame and the second frame, comprising: a flicker component estimation unit; and a pixel value correction unit, wherein the flicker component estimation unit is configured to obtain a flicker component value based on pixel values of in-region pixels in the first and second frames, the in-region pixels are composed of a plurality of pixels included in a predetermined region in the first and second frames, the plurality of pixels include an attention pixel and a surrounding pixel arranged around the attention pixel, the flicker component value corresponds to a degree of flicker occurring in an image display unit due to a pixel response delay in the in-region pixels when the first frame transits to the second frame, the pixel response delay corresponds to a difference in response speed between an increasing pixel where a pixel value increases and a decreasing pixel where a pixel value decreases among the plurality of pixels when the first frame transits to the second frame, the pixel value correction unit is configured to obtain a corrected pixel value based on the flicker component value, and the corrected pixel value is a value obtained by correcting the pixel value of the attention pixel in the second frame.

(2) The image processing device of (1), wherein the flicker component estimation unit obtains the flicker component value based on a difference between a first statistical value and a second statistical value, the first statistical value is a statistical value of the pixel values of the plurality of pixels of the in-region pixels in the first frame, and the second statistical value is a statistical value of the pixel values of the plurality of pixels of the in-region pixels in the second frame.

(3) The image processing device of (2), wherein the statistical value is an average value, a variance value, a median value, or a low-frequency component value of the pixel values of the plurality of pixels of the in-region pixels, and the low-frequency component value is a weighted value in a probability density distribution according to at least one of an interpixel distance and a pixel value.

(4) The image processing device of any one of (1) to (3), wherein the flicker component estimation unit obtains the flicker component value based on an increasing value and a decreasing value, the increasing value is based on the pixel value of the increasing pixel among the plurality of pixels when the first frame transits to the second frame, and the decreasing value is based on the pixel value of the decreasing pixel among the plurality of pixels when the first frame transits to the second frame.

(5) The image processing device of (4), wherein the increasing value is a sum of a difference between the pixel values of the first and second frames in the increasing pixel, and the decreasing value is a sum of a difference between the pixel values of the first and second frames in the decreasing pixel.

(6) The image processing device of any one of (1) to (5), wherein the image processing device further comprises a pixel value determination unit, the pixel value correction unit is configured to obtain a transition amount based on the flicker component value and obtain the corrected pixel value based on the transition amount, and the pixel value determination unit determines the pixel value of the attention pixel in the first frame used in the correction processing after a current correction processing according to a magnitude of the transition amount.

(7) The image processing device of (6), wherein when the transition amount is equal to or greater than a predetermined threshold, the pixel value determination unit sets the pixel value of the attention pixel in the first frame used in the correction processing after the current correction processing as the pixel value of the attention pixel in the second frame of the current correction processing, when the transition amount is less than the predetermined threshold, the pixel value determination unit sets the pixel value of the attention pixel in the first frame used in the correction processing after the current correction processing as a transition pixel value, and the transition pixel value is the corrected pixel value obtained in the current correction processing, the pixel value of the attention pixel in the second frame in the current correction processing, or a value between these two.

(8) The image processing device of any one of (1) to (7), wherein the image processing device further comprises an image display unit, and the image display unit is configured to display a frame where the corrected pixel value obtained by the pixel value correction unit is reflected.

(9) An image processing method that performs a correction processing to correct a second frame based on a first frame and the second frame that is a frame after the first frame, comprising: a flicker component estimation step; and a pixel value correction step, wherein in the flicker component estimation step, a flicker component value is obtained based on pixel values of in-region pixels in the first and second frames, the in-region pixels are composed of a plurality of pixels included in a predetermined region in the first and second frames, the plurality of pixels include an attention pixel and a surrounding pixel arranged around the attention pixel, the flicker component value corresponds to a degree of flicker occurring in an image display unit due to a pixel response delay in the in-region pixels when the first frame transits to the second frame, the pixel response delay corresponds to a difference in response speed between an increasing pixel where a pixel value increases and a decreasing pixel where a pixel value decreases among the plurality of pixels when the first frame transits to the second frame, in the pixel value correction step, a corrected pixel value is obtained based on the flicker component value, and the corrected pixel value is a value obtained by correcting the pixel value of the attention pixel in the second frame.

(10) A computer program causing a computer to execute the image processing method of (9).

BRIEF DESCRIPTION OF DRAWINGS

FIG. 4A shows an in-region pixel Rg, am attention pixel a1, and a surrounding pixel a2 in the frame. FIG. 4B shows an in-region pixel Rg in an attention pixel a1 different from that in FIG. 4A.

FIG. 6A shows the pixel value of the in-region pixel Rg in the Nth frame (corresponding to the frame F1), and FIG. 6B shows the pixel value of the in-region pixel Rg in the N+1th frame (corresponding to the frame F2). In FIG. 6A and FIG. 6B, the pixel values (numbers) of the increasing pixel is underlined for emphasis.

DESCRIPTION OF EMBODIMENTS

Hereinafter, an embodiment of the present invention will be described with reference to the drawings. Various features shown in the following embodiments can be combined with each other. Also, each feature can be an invention independently.

1. Description of Overall Configuration

Figure 1:
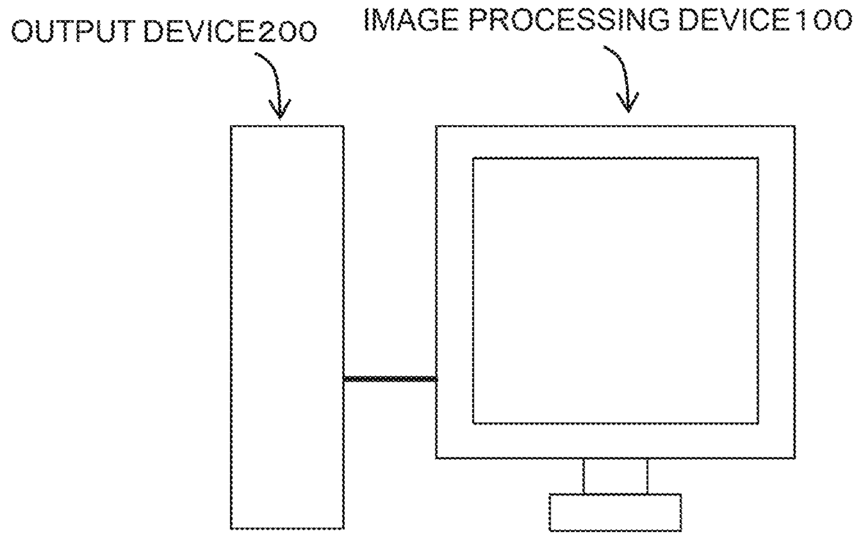
FIG. 1 is a schematic diagram showing an image processing device 100 according to an embodiment and an output device 200 that outputs a video signal.

The overall configuration of the image processing device 100 according to the embodiment will be described. In the embodiment, the image processing device 100 is communicatively connected to an output device 200 as shown in FIG. 1. The output device 200 is an information processing device (e.g., a personal computer) that is configured to be able to output a video signal.

Figure 2A:
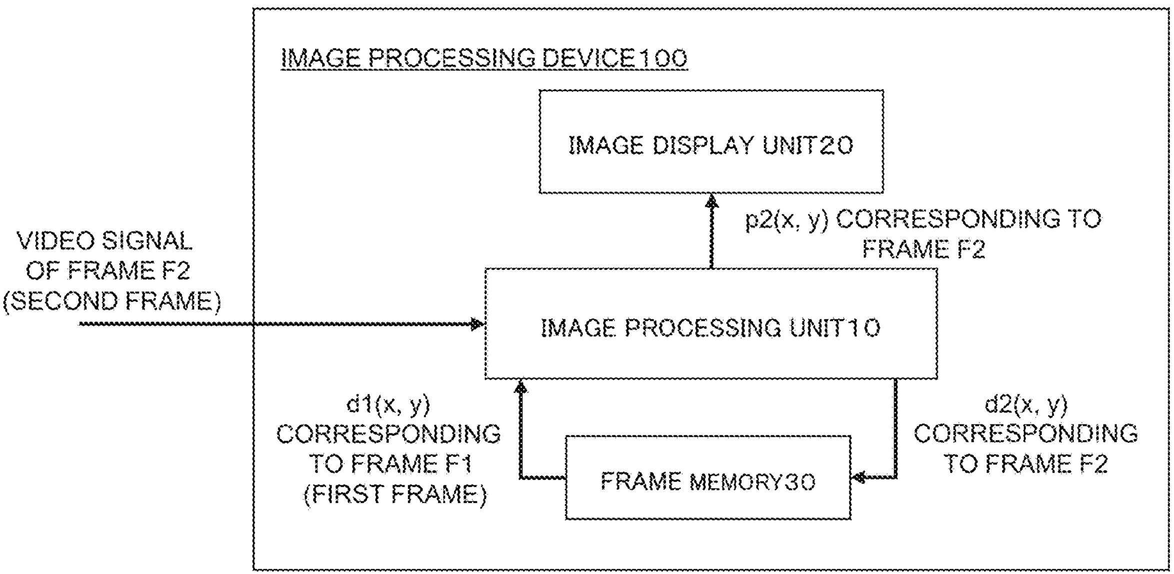
FIG. 2A is a functional block diagram of the image processing device 100 shown in FIG. 1, showing a flow of data related to a pair of frames F1, F2 (an example of first and second frames).
Figure 2B:
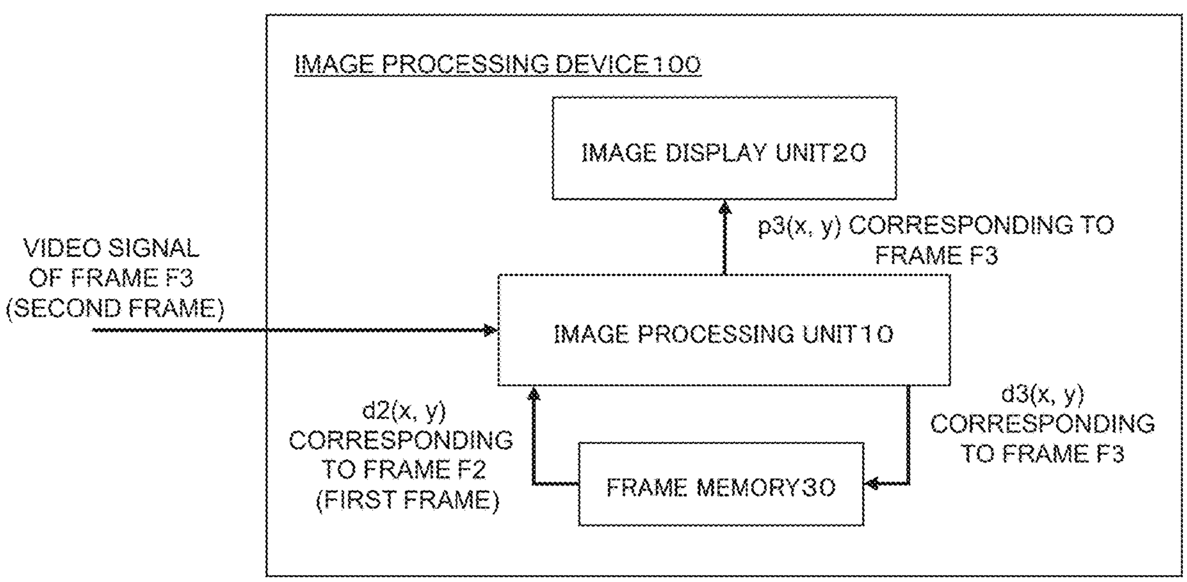
FIG. 2B is a functional block diagram of the image processing device 100 shown in FIG. 1, showing a flow of data related to a pair of frames F2, F3 (an example of first and second frames). It is noted that p2(*x, y*) and p3(*x, y*) in FIG. 2A and FIG. 2B correspond to corrected pixel values p(x, y) calculated sequentially using a pair of frames, and the "2" in "p2" and the "3" in "p3" represent the order of the frames. Similarly, d2(*x, y*) and d3(*x, y*) in FIG. 2A and FIG. 2B correspond to pixel values d(x, y) determined sequentially by an image processing unit 10 using a pair of frames and stored in a frame memory 30, and the "2" in "d2" and the "3" in "d3" represent the order of the frames.
Figure 3:
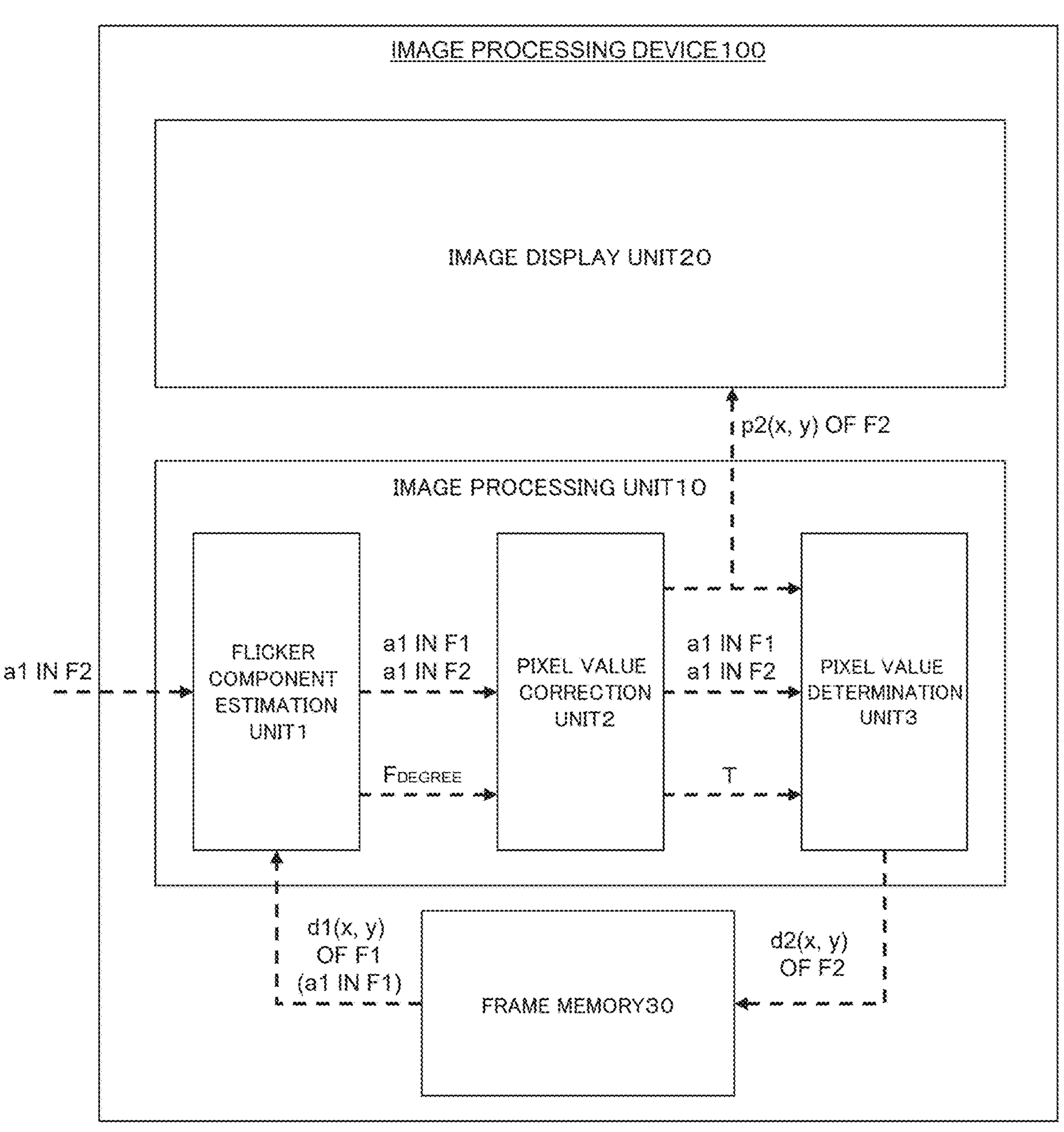
FIG. 3 is a functional block diagram of the image processing device 100 shown in FIG. 1, and shows a detailed configuration of the image processing unit 10 in FIG. 2A.

As shown in FIG. 2A and FIG. 2B, the image processing device 100 includes an image processing unit 10, an image display unit 20, and a frame memory 30. It is noted that the image display unit 20 can be configured, for example, as a liquid crystal monitor, and the frame memory 30 stores pixel values of each pixel of a frame used in various processing of the image processing unit 10. As shown in FIG. 3, the image processing device 100 includes a flicker component estimation unit 1, a pixel value correction unit 2, and a pixel value determination unit 3.

The components of the image processing device 100 may be realized by software or by hardware. When realized by software, various functions can be realized by a CPU executing a computer program. The program may be stored in a built-in storage unit or may be stored in a non-transitory computer readable medium. In addition, a program stored in an external storage unit may be read out and realized by so-called cloud computing. When realized by hardware, various circuits such as an ASIC, an FPGA, or a DRP (Dynamically Reconfigurable Processor) can be used. In this embodiment, various information and concepts that encompass this are handled, which are represented by high and low signal values as a binary bit collection consisting of 0 or 1, and communication and calculations can be performed by the above-mentioned software or hardware aspects.

The image processing device 100 has a function for suppressing flicker. Flicker is flickering that occurs in the image display unit 20 due to pixel response delay when a frame transitions.

It is noted that "when a frame transitions" corresponds to a transition from a frame of any timing to a frame of the next timing.

Furthermore, the pixel response delay means that there is a difference in response between pixels depending on an operation of the pixels of the image display unit 20. Specifically, the image display unit 20 is composed of a liquid crystal monitor, and the response speed when the pixel value of each pixel of the image display unit 20 increases is slower than the response speed when the pixel value of each pixel of the image display unit 20 decreases. In other words, when the frame transitions, pixels where pixel value decreases (decreasing pixels) reach a desired pixel value more quickly than pixels where pixel value increases (increasing pixels).

In the embodiment, "pixel value increases" refers to "the pixel value (relatively low value) of a pixel at any coordinate in the frame F1 increases to the pixel value (relatively high value) of the pixel at the same coordinate in the frame F2." Similarly, "pixel value decreases" refers to "the pixel value (relatively high value) of a pixel at any coordinate in the frame F1 decreases to the pixel value (relatively low value) of the pixel at the same coordinate in the frame F2." Next, an overview of the data including the frames F1 and F2 described here and its flow will be described.

In FIG. 2A, the image processing unit 10 obtains a video signal of the frame F2 and obtains a pixel value d1(*x, y*) corresponding to the frame F1, which is a frame preceding the frame F2. This pixel valuQe d1(*x, y*) is a pixel value determined by the pixel value determination unit 3 described later before the processing of FIG. 2A, and this pixel value d1(*x, y*) corresponding to the frame F1 is stored in the frame memory 30. Also, as shown in FIG. 2A, a corrected pixel value p2(*x, y*) corresponding to the frame F2 is input to the image display unit 20. The corrected pixel value p2(*x, y*) is a pixel value calculated by the pixel value correction unit 2 described later. After the corrected pixel value p1(*x, y*) corresponding to the frame F1 is input to the image display unit 20 (p1 is not shown in the figure), a value that takes into account the transition amount of the pixel value until it is actually displayed on the image display unit 20 is the pixel value d1(*x, y*) corresponding to the frame F1. The pixel value d1(*x, y*) corresponding to the frame F1 may be the same as or different from the pixel value actually displayed by image display unit 20. The pixel value d1(*x, y*) is determined by the pixel value determination unit 3 described later.

It is noted that a frame having the pixel value d1(*x, y*) corresponding to the frame F1 is an example of a first frame. The image processing unit 10 processes the frame F2, which is a frame after the frame F1 and is to be corrected. This frame F2 is an example of a second frame. When the second frame is not corrected, flicker may occur depending on a condition when the first frame transits to the second frame.

In a processing the next frame, as shown in FIG. 2B, the image processing unit 10 obtains a video signal of frame F3 and obtains a pixel value d2(*x, y*) corresponding to the frame F2, which is a frame preceding the frame F3. This pixel value d2(*x, y*) is a pixel value determined by the pixel value determination unit 3 in the processing of FIG. 2A, and this pixel value d2(*x, y*) corresponding to the frame F2 is stored in the frame memory 30. Also, as shown in FIG. 2B, a corrected pixel value p3(*x, y*) corresponding to the frame F3 is input to the image display unit 20. Like the corrected pixel value p2(*x, y*), the corrected pixel value p3(*x, y*) is a pixel value calculated by the pixel value correction unit 2 described later.

It is noted that a frame having the pixel value d2(*x, y*) corresponding to the frame F2 is an example of the first frame. The frame F3, which is a frame after the frame F2 and is to be corrected, is an example of the second frame.

2. Image Processing Unit 10

As shown in FIG. 2A, the image processing unit 10 is configured to perform a correction processing for correcting the frame F2 based on the video signal of the frame F1 and the video signal of the frame F2, which is a frame after the frame F1. As shown in FIG. 3, the image processing unit 10 includes the flicker component estimation unit 1, the pixel value correction unit 2, and the pixel value determination unit 3 for performing various processing including this correction processing. The flicker component estimation unit 1 and other units are described below.

2-1 Flicker Component Estimation Unit 1

The flicker component estimation unit 1 is configured to obtain a flicker component value $F_{DEGREE}$ based on the pixel value of the in-region pixel Rg in the frame F1 and the pixel value of the in-region pixel Rg in the frame F2. The flicker component value $F_{DEGREE}$ is obtained based on the in-region pixel Rg in the frame F2 that is in the same position as the in-region pixel Rg in the frame F1. The operation in the flicker component estimation unit 1 is an example of a flicker component estimation step. The flicker component value $F_{DEGREE}$ corresponds to a degree of flicker occurring in the image display unit due to a pixel response delay in the in-region pixel Rg when the frame F1 transits to the frame F2. The flicker component value $F_{DEGREE}$ is then used to correct the pixel value of an arbitrary attention pixel a1 included in a frame in order to suppress flicker when the frame transitions.

Figure 4A:
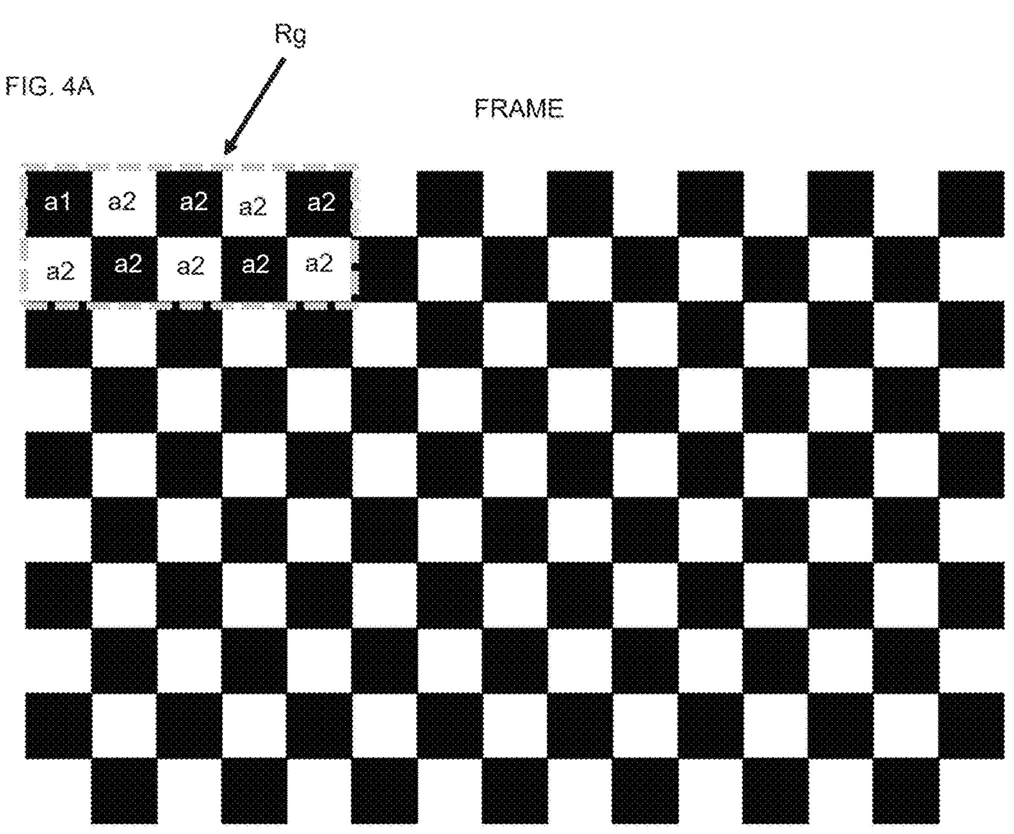
FIG. 4A and FIG. 4B show an example of a frame (a dot mesh frame) where flicker is likely to occur.
Figure 4B:
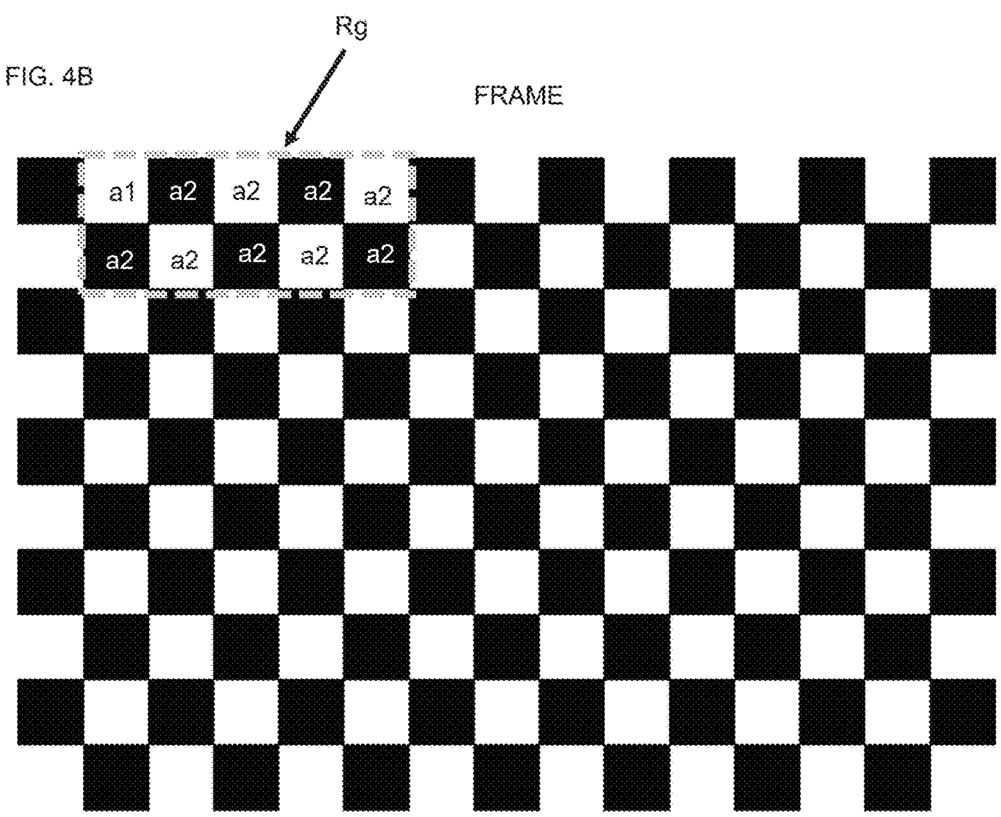

The flicker component value $F_{DEGREE}$ is obtained for each attention pixel a1 in the frame (for each pixel at a specific coordinate in the frames F1 and F2). In other words, as shown in FIGS. 4A and 4B, multiple attention pixels a1 are set in the frame (the frames F1 and F2), and the flicker component value $F_{DEGREE}$ is obtained sequentially for each attention pixel a1.

In addition, the flicker component estimation unit 1 obtains the flicker component value $F_{DEGREE}$ for any consecutive pair of frames. That is, the flicker component estimation unit 1 obtains each flicker component value $F_{DEGREE}$ for correcting each attention pixel a1 of the N+1th frame based on the Nth frame (corresponding to the frame F1) and the N+1th frame (corresponding to the frame F2). Next, the flicker component estimation unit 1 obtains each flicker component value $F_{DEGREE}$ for correcting each attention pixel a1 of the N+2th frame based on the N+1th frame (corresponding to the frame F1) and the N+2th frame (corresponding to the frame F2). It is noted that N is a positive integer.

2-1-1 in-Region Pixel Rg

The in-region pixel Rg has one attention pixel a1 included and surrounding pixel a2 arranged around the attention pixel a1 in each frame. In other words, in-region pixel Rg is a group of pixels consisting of a plurality of pixels such as the attention pixel a1 and the surrounding pixel a2.

It is noted that the in-region pixel Rg may include only one surrounding pixel a2, but in the embodiment, it includes a plurality of surrounding pixels a2 from the viewpoint of obtaining a more appropriate flicker component value $F_{DEGREE}$. The setting range (shape) of the in-region pixel Rg is not particularly limited, but can be set to a rectangular range, for example, as shown in FIG. 4A. Specifically, regarding the size of the in-region pixel Rg, when the number of columns in the vertical direction is a and the number of columns in the horizontal direction is b, the in-region pixel Rg shown in FIG. 4A is composed of 2 columns×5 columns of pixels.

Here, the values of the number of columns a and the number of columns b are, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, and 63, and can also be defined within a range between any two of the numerical values exemplified here. The values of the number of columns a and the number of columns b, and the ranges of the number of columns a and the number of columns b, may be the same or different.

Furthermore, there is no particular limitation on which coordinates of pixel in the in-region pixel Rg is set as the attention pixel a1. For example, as shown in FIG. 4A, the attention pixel a1 can be set to the pixel located in the upper left corner in the in-region pixel Rg. Also, when the value of column number a and the value of column number b are both odd numbers, the in-region pixel Rg has a central pixel, and the attention pixel a1 can be set as that central pixel.

It is noted that it is not necessary to perform the correction processing according to the embodiment on all pixels of the frame F2, and it may be within a predetermined range. In other words, it is not necessary to set all pixels in each frame as the attention pixel a1.

2-1-2 Flicker Component Value $F_{DEGREE}$

The method of obtaining the flicker component value $F_{DEGREE}$ by the flicker component estimation unit 1 is described below.

The degree of flicker increases when the actual transition of the average value (corresponding to the actual transition line L2 in FIG. 5) deviates greatly from the line (corresponding to the ideal transition line L1 in FIG. 5) that connects the average value of the pixel values (for example, the average value of the pixel values of the Nth frame and the average value of the pixel values of the N+1th frame) for a pair of arbitrary regions of two consecutive frames.

Figure 5:
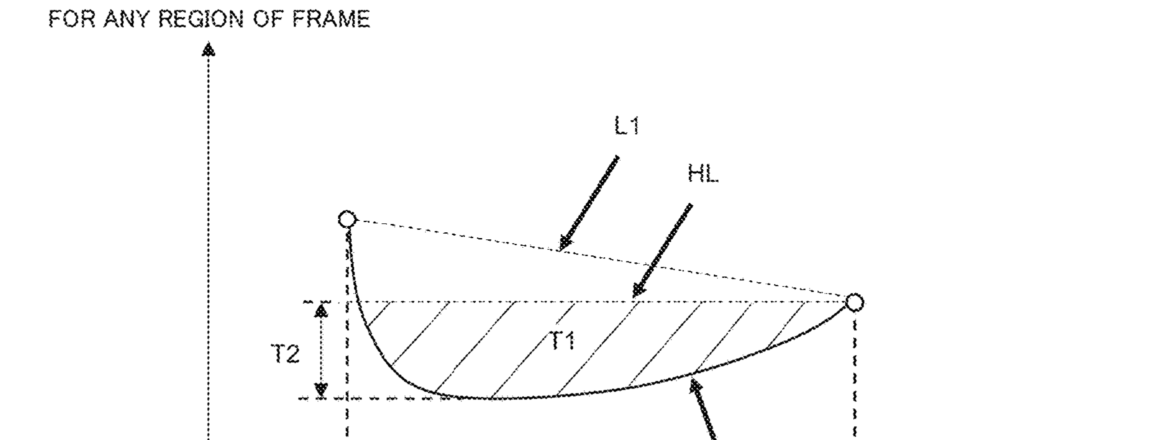
FIG. 5 is a graph for explaining a situation where flicker is likely to occur.

When the average value of the pixel values for an arbitrary region of a frame transitions along the transition line L1 shown in FIG. 5, this is an ideal transition, and a human are unlikely to perceive flicker. In contrast, when the average value of the pixel values of the frame transitions, as in transition line L2, and the average value of the pixel values exceeds the larger one or lowers the smaller one among the average value of the pixel values at the beginning or end of transition line L1, the human may perceive flicker. In general, the way in which the average value of the pixel values of an actual frame transitions varies depending on the situation, but deviates from the transition line L1.

The flicker component value $F_{DEGREE}$ takes into account the deviation mentioned above. There are two viewpoints for this deviation.

The first viewpoint is the area T1 (shaded area in FIG. 5) between the horizontal line HL passing through the end of the transition line L1 shown in FIG. 5 and the transition line L2. In other words, the first viewpoint corresponds to the part of the transition line L2 that protrudes downward from the horizontal line HL. More generally, when a rectangle is defined with the start and end of the transition line L1 as its diagonal lines, the area of the transition line L2 outside this rectangle corresponds to the first viewpoint.

The second viewpoint is the maximum distance T2 shown in FIG. 5. The maximum distance T2 corresponds to the maximum length between the horizontal line HL and the transition line L2. Specifically, when a rectangle is defined with the start and end of the transition line L1 as its diagonal lines, the longest of the perpendicular lines in the transition line L2 that extend from the edge of the above rectangle tangent to the area outside this rectangle (in FIG. 5, the edge overlapping the horizontal line HL) and intersect the transition line L2 corresponds to the second viewpoint. When the area T1 of the first viewpoint and the maximum distance T2 of the second viewpoint are large, the degree where flicker is perceived increases.

The flicker component value $F_{DEGREE}$ according to the embodiment is a value that takes into account the first and second viewpoints. Specifically, the flicker component value $F_{DEGREE}$ is expressed as the product of the following two terms (first and second terms) as shown in the following formula (9). Furthermore, the flicker component value $F_{DEGREE}$ can be obtained based on the following formulas (1) to (8).

In the calculation method of the first and second terms described here, the size of the in-region pixel Rg is such that the number of columns a in the vertical direction is 2M+1 and the number of columns b in the horizontal direction is 2N+1 (where M and N are positive integers). The variables in the formula are as follows.

(x, y) are the coordinates of the pixel in the frame (x is the horizontal direction, y is the vertical direction).

f(x, y) is the pixel value of the pixel (the attention pixel a1 and the surrounding pixel a2) at the coordinates (x, y) in the subsequent frame (the frame F2).

f(x, y) is the pixel value of the pixel (the attention pixel a1 and the surrounding pixel a2) at coordinates (x, y) in the previous frame (the frame F1).

$R_{THRESHOLD}$ and $F_{THRESHOLD}$ are predetermined thresholds for normalizing the values of the increasing value ($R_{SUM}$) and decreasing value ($F_{SUM}$) described below to 0 to 1. $R_{THRESHOLD}$ can use a value in the range of 0.4 to 0.6 times the maximum value that $R_{SUM}$ can take. $F_{THRESHOLD}$ can use a value in the range of 0.4 to 0.6 times the maximum value that $F_{SUM}$ can take.

bitdepth represents the bit depth and is a value for normalizing the values of $CF_{AVE}$ and $PF_{AVE}$ in formulas (1) and (2) to 0 to 1.

[Formula 1]

$$PF_{AVE} = \frac{\sum_{n=-N}^{N} \sum_{m=-M}^{M} f'(x+m, y+n)}{(2*M+1)*(2*N+1)*\left(2^{bitdepth}-1\right)} \tag{1}$$

[Formula 2]

$$CF_{AVE} = \frac{\sum_{n=-N}^{N} \sum_{m=-M}^{M} f(x+m, y+n)}{(2*M+1)*(2*N+1)*\left(2^{bitdepth}-1\right)} \tag{2}$$

[Formula 3]

$$R_p(x,y) = \begin{cases} f(x, y) - f'(x, y) & f9x, y) - f'(x, y) \geq 0 \\ 0 & \text{otherwise} \end{cases} \tag{3}$$

[Formula 4]

$$F_p(x, y) = \begin{cases} f9x, y) - f'(x, y) & f(x, y) - f'(x, y) \geq 0 \\ 0 & \text{otherwise} \end{cases} \tag{4}$$

[Formula 5]

$$R_{SUM}(x, y) = \sum_{n=-N}^{N} \sum_{m=-M}^{M} R_p(x+m, y+n) \tag{5}$$

[Formula 6]

$$F_{SUM}(x, y) = \sum_{n=-N}^{N} \sum_{m=-M}^{M} F_P(x+m, y+n) \tag{6}$$

[Formula 7]

$$R_{SUM} = \begin{cases} 1 & R_{SUM}(x, y) \geq R_{THRESHOLD} \\ \dfrac{R_{SUM}(x, y)}{R_{THRESHOLD}} & \text{otherwise} \end{cases} \tag{7}$$

[Formula 8]

$$F_{SUM} = \begin{cases} 1 & F_{SUM}(x, y) \geq F_{THRESHOLD} \\ \dfrac{F_{SUM}(x, y)}{F_{THRESHOLD}} & \text{otherwise} \end{cases} \tag{8}$$

[Formula 9]

$$F_{DEGREE}=(1-|CF_{AVE}-PF_{AV}|)*\max(R_{SUM},F_{SUM}) \tag{9}$$

2-1-2-1 FIRST TERM: $1-|CF_{AVE}-PF_{AVE}|$

The first term is a term ($1-|CF_{AVE}-PF_{AVE}|$) related to the difference between the average values of pixel values in the frames F1 and F2. In other words, the flicker component estimation unit 1 obtains the flicker component value $F_{DEGREE}$ based on the difference between the first statistical value ($PF_{AVE}$) and the second statistical value ($CF_{AVE}$).

The first statistical value ($PF_{AVE}$) is a statistical value of the pixel values of the in-region pixel Rg of the frame F1, and in this embodiment, it is the average value.

The second statistical value ($CF_{AVE}$) is a statistical value of the pixel values of the in-region pixel Rg of the frame F2, and in this embodiment, it is the average value.

Here, preferably, the flicker component estimation unit 1 reduces the flicker component value $F_{DEGREE}$ when the difference between the first statistical value ($PF_{AVE}$) and the second statistical value ($CF_{AVE}$) is large, and increases the flicker component value $F_{DEGREE}$ when the difference is small.

The first statistical value ($PF_{AVE}$) is as shown in formula (1) above, and is the average value of the pixel value of the in-region pixel Rg in the frame F1 (previous frame). The first statistical value ($PF_{AVE}$) is normalized by the bitdepth, and takes a value between 0 and 1.

The second statistical value ($CF_{AVE}$) is as shown in formula (2) above, and is the average value of the pixel value of the in-region pixel Rg in the frame F2 (subsequent frame). The second statistical value ($CF_{AVE}$) is also normalized by the bitdepth, and takes a value between 0 and 1.

In this way, the first term is expressed based on the difference between $CF_{AVE}$ (the second statistical value) and $PF_{AVE}$ (the first statistical value).

As shown in FIG. 5, when the frame F1 (the Nth frame) transits to the frame F2 (the N+1th frame), the closer the average values of the pixel values of the frames are, the larger the first and second viewpoint values (the area T1 and the maximum distance T2) are likely to be. In other words, the closer the average value of the pixel values of the frame F1, the previous frame, is to the average value of the pixel values of the frame F2, the subsequent frame, the larger the first and second viewpoint values are likely to be. These average values being closer corresponds to $|CF_{AVE}-PF_{AVE}|$ becoming smaller, and as a result, the first term becoming larger. This corresponds to the case where the constituent pixels of the frames F1 and F2 are, for example, a dot mesh as shown in FIG. 4A and FIG. 4B.

2-1-2-2 Second Term: $\max(R_{SUM}, F_{SUM})$

The second term is a term ($\max(R_{SUM}, F_{SUM})$) related to the sum of the differences of the pixels where pixel values change among the pixels in the in-region pixel Rg when the frame F1 transits to the frame F2. It is noted that in frames where flicker is likely to occur (for example, dot mesh frames), it is known that the absolute values of one or both of $R_{SUM}$ and $F_{SUM}$ are large, so in this embodiment, max ($R_{SUM}$, $F_{SUM}$) is adopted. In addition, if only the first term is used, in the case of a still image or when there are few increasing and decreasing pixels, the first term becomes large, and the flicker component value ($F_{DEGREE}$) cannot be obtained with high accuracy. Therefore, as a countermeasure against this, in this embodiment, in addition to the first term, the second term is also adopted.

The flicker component estimation unit 1 obtains the flicker component value $F_{DEGREE}$ based on the increasing value ($R_{SUM}$) and the decreasing value ($F_{SUM}$). For example, when one or both of the increasing value ($R_{SUM}$) and decreasing value ($F_{SUM}$) are large, the flicker component value ($F_{DEGREE}$) is increased. Also, for example, when there is a high rate of still images or in-region pixel increasing (decreasing) in one direction and the first term is large, the flicker component value ($F_{DEGREE}$) is decreased.

The increasing value ($R_{SUM}$(x, y)) in formula (5) can be obtained using formula (3). The increasing value ($R_{SUM}$(x, y)) in formula (5) is based on the pixel values of the pixel (the increasing pixel) in the in-region pixel Rg where the pixel value increases when the frame F1 transits to the frame F2. Specifically, the increasing value ($R_{SUM}$(x, y)) is the sum of the differences in the pixel values of the increasing pixels in the frames F1 and F2.

The decreasing value ($F_{SUM}$(x, y)) in formula (6) can be obtained using formula (4). The decreasing value ($F_{SUM}$(x, y)) in formula (6) is based on the pixel values of the pixel (the decreasing pixel) in the in-region pixel Rg where the pixel value decreases when the frame F1 transits to the frame F2. Specifically, the decreasing value ($F_{SUM}$(x, y)) is the sum of the differences in the pixel values of the decreasing pixels in the frames F1 and F2.

Here, in the embodiment, the increasing value ($R_{SUM}$(x, y)) in formula (5) and the decreasing value ($F_{SUM}$(x, y)) in formula (6) are normalized as shown in formulas (7) and (8). In other words, when calculating the flicker component value $F_{DEGREE}$ in formula (9), the normalized increasing value ($R_{SUM}$) and decreasing value ($F_{SUM}$) in formulas (7) and (8) are used. The larger the first term and the larger the second term, the more likely it is that the values of the first and second viewpoints (the area T1 and the maximum distance T2) will be large.

2-2 Pixel Value Correction Unit 2

The pixel value correction unit 2 is configured to obtain a corrected pixel value p (corresponding to the corrected pixel values p1 to p3 shown in FIGS. 2A and 2B) based on the flicker component value $F_{DEGREE}$. The corrected pixel value p is a value (pixel value) obtained by correcting the pixel value of the attention pixel a1 in the frame F2 to suppress the occurrence of flicker in the relationship between the frames F1 and F2. In the embodiment, the pixel value correction unit 2 is configured to first obtain a transition amount T (described later) based on the flicker component value $F_{DEGREE}$, and then obtain a corrected pixel value p based on this transition amount T. The operation in the pixel value correction unit 2 is an example of a pixel value correction step.

It is noted that the transition amount T and the corrected pixel value p are obtained for each attention pixel a1 included in the frame (for each pixel at a specified coordinate in the frame F2). In addition, the pixel value correction unit 2 obtains the transition amount T and the corrected pixel value p for any consecutive pair of frames. In other words, the pixel value correction unit 2 obtains each transition amount T and each corrected pixel value p for correcting each attention pixel a1 in the N+1th frame based on the Nth frame (corresponding to the frame F1) and the N+1th frame (corresponding to the frame F2). Next, the pixel value correction unit 2 obtains each transition amount T and each corrected pixel value p for correcting each attention pixel a1 in the N+2th frame based on the N+1th frame (corresponding to the frame F1) and the N+2th frame (corresponding to the frame F2).

2-2-1 Transition Amount T

The transition amount T is obtained for the two purposes described below.

The first purpose is to obtain a corrected pixel value p for correcting the pixel value of the attention pixel a1 in the frame F2.

The second purpose is to determine the pixel value of the attention pixel a1 in the frame F1 to be used in the correction processing after the current correction processing. The method of this determination will be described in the pixel value determination unit 3 described below.

As shown in formula (13) below, the transition amount T of the coordinates (x, y) is $T_R$ in formula (11) when the pixel value of the attention pixel a1 at the coordinates (x, y) in the subsequent frame (the frame F2) is greater than or equal to the pixel value of the attention pixel a1 at the coordinates (x, y) in the previous frame (the frame F1).

Further, the transition amount T of the coordinates (x, y) is $T_F$ in formula (12) in other cases. In other words, the transition amount T of the coordinates (x, y) is $T_F$ in formula (12) when the pixel value of the attention pixel a1 at the coordinates (x, y) in the subsequent frame (the frame F2) is less than the pixel value of the attention pixel a1 at the coordinates (x, y) in the previous frame (the frame F1).

Here, formula (11) uses the flicker component value $F_{DEGREE}$ obtained by the flicker component estimation unit 1, the CLIP function, a predetermined value $R_{AMP}$, and a predetermined value $R_{CLIP}$.

Also, formula (12) uses the flicker component value $F_{DEGREE}$ obtained by the flicker component estimation unit 1, the CLIP function, a predetermined value $F_{AMP}$, and a predetermined value $F_{CLIP}$.

The CLIP function (hereinafter referred to as clip processing) in formula (10) limits the range of values that the transition amount T ($T_R$ and $T_F$) can take.

$R_{AMP}$ is a parameter for the amplitude of the increasing value ($R_{SUM}$). $R_{AMP}$ can be set to any value.

$F_{AMP}$ is a parameter for the amplitude of the decreasing value ($F_{SUM}$). $F_{AMP}$ can be set to any value.

$R_{CLIP}$ is a parameter for the clip processing for $T_R$. $R_{CLIP}$ can be set to a value greater than or equal to −1 and less than or equal to 1.

$F_{CLIP}$ is a parameter for clip processing for $T_F$. $R_{CLIP}$ can be set to a value greater than or equal to −1 and less than or equal to 1.

It is noted that the positive and negative of the clip processing parameters $R_{CLIP}$ and $F_{CLIP}$ can be set according to $R_{AMP}$ and $F_{AMP}$, respectively.

When the transition amount T is positive, so-called overdrive correction processing where the transition of the pixel value of the attention pixel a1 in the frame F2 accelerates is performed. On the other hand, when the transition amount T is negative, so-called underdrive correction processing where the transition of the pixel value of the attention pixel a1 in the frame F2 decelerates is performed. As an example, the overdrive correction processing or the underdrive correction processing corresponds to formula (14) described below.

[Formula 10]

$$CLIP(a, b) = \begin{cases} b & |a| \geq |b| \\ a & \text{otherwise} \end{cases} \quad (10)$$

[Formula 11]

$$T_R = \text{CLIP}(F_{DEGREE} * R_{AMP}, R_{CLIP}) \quad (11)$$

[Formula 12]

$$T_F = \mathrm{CLIP}(F_{DEGREE} * F_{AMP}, F_{CLIP}) \quad (12)$$

[Formula 13]

$$T = \begin{cases} T_R & f(x, y) \geq f'(x, y) \\ T_F & \text{otherwise} \end{cases} \quad (13)$$

The embodiment assumes that the response speed when the pixel value of each pixel of the image display unit 20 increases is slower than the response speed when the pixel value of each pixel of the image display unit 20 decreases. On the other hand, depending on the response characteristics of the LCD monitor, the response speed when the pixel value of each pixel of the image display unit 20 increases may be faster than the response speed when the pixel value of each pixel of the image display unit 20 decreases. Even in this case, when the transition amount T is positive, so-called overdrive correction processing where the transition of the pixel value of the attention pixel a1 of the frame F2 accelerates is performed. On the other hand, when the transition amount T is negative, so-called underdrive correction processing where the transition of the pixel value of the attention pixel a1 of the frame F2 decelerates is performed.

2-2-2 Corrected Pixel Value p

The pixel value correction unit 2 can obtain the corrected pixel value p based on the following formula (14). That is, the corrected pixel value p is obtained based on the pixel value (f'(x, y)) of the attention pixel a1 at the coordinates (x, y) of the first frame, the pixel value (f(x, y)) of the attention pixel a1 at the coordinates (x, y) of the second frame, and the transition amount T. Then, the pixel value correction unit 2 outputs the corrected pixel value p of each attention pixel a1 to the image display unit 20.

[Formula 14]

$$p(x,y) = f(x,y) + ((f(x,y) - f(x,y)) * T) \quad (14)$$

The pixel value correction unit 2 obtains the corrected pixel value p based on the attention pixel a1 in the frame F1 (an example of the first frame) and the attention pixel a1 in the frame F2 (an example of the second frame). In other words, the pixel value correction unit 2 obtains the corrected pixel value p based on the difference between the attention pixel a1 in the frame F1 (an example of the first frame) and the attention pixel a1 in the frame F2 (an example of the second frame). More specifically, the pixel value correction unit 2 obtains the corrected pixel value p based on the difference between the pixel value (f(x, y)) of the attention pixel a1 at the coordinates (x, y) in the frame F1 (an example of the first frame) and the pixel value (f(x, y)) of the attention pixel a1 at the coordinates (x, y) in the frame F2 (an example of the second frame).

Furthermore, in the embodiment, in addition to the frames F1 and F2, the corrected pixel value p is obtained using the transition amount T. In other words, in the embodiment, the pixel value correction unit 2 obtains the corrected pixel value p based on the difference between the pixel value (f'(x, y)) of the attention pixel a1 at the coordinates (x, y) in the frame F1 (an example of the first frame) and the pixel value (f(x, y)) of the attention pixel a1 at the coordinates (x, y) in the frame F2 (an example of the second frame), and the transition amount T.

It is noted that when there is no difference between the attention pixel a1 in the frame F1 (an example of the first frame) and the attention pixel a1 in the frame F2 (an example of the second frame), the pixel value correction unit 2 may not correct the attention pixel a1 in the frame F2 (an example of the second frame) that is the target of correction.

2-3 Pixel Value Determination Unit 3

The pixel value determination unit 3 determines the pixel value of the attention pixel a1 in the frame F1 to be used in the correction processing (correction processing using the N+1th frame and the N+2th frame) following the current correction processing (correction processing using the Nth frame and the N+1th frame) according to the magnitude of the transition amount T. It is noted that d(x, y) in the following formula (15) corresponds to the pixel value determined by the pixel value determination unit 3, and this pixel value is stored in the frame memory 30.

In other words, in the embodiment, the corrected pixel value p is not necessarily used in the subsequent correction processing (correction processing using the N+1th frame and the N+2th frame), and depending on the conditions, the uncorrected pixel value (the pixel value of the N+1th frame itself) is used.

As shown in the following formula (15), when the transition amount T is equal to or greater than a predetermined threshold $D_{THRESHOLD}$, the pixel value determination unit 3 determines the pixel value of the attention pixel a1 in the frame F1 to be used in the correction processing after the current correction processing to be the pixel value of the attention pixel a1 in the frame F2 of the current correction processing. In other words, the uncorrected pixel value is used.

On the other hand, when the transition amount T is less than the predetermined threshold $D_{THRESHOLD}$, the pixel value determination unit 3 determines the pixel value of the attention pixel a1 in the frame F1 to be used in the correction processing after the current correction processing to be the corrected pixel value p obtained by the pixel value correction unit 2. In other words, the corrected pixel value is used. Here, the pixel value (corrected pixel value p) determined by the pixel value determination unit 3 is an example of a transition pixel value.

[Formula 15]

$$d(x, y) = \begin{cases} f(x, y) & T \geq D_{THRESHOLD} \\ p(x, y) & \text{otherwise} \end{cases} \quad (15)$$

In this way, the pixel value determination unit 3 changes the pixel value used in the subsequent correction processing according to the magnitude of the transition amount T, thereby suppressing a decrease in the calculation accuracy of the flicker component value $F_{DEGREE}$ in the subsequent correction processing.

In other words, when the transition amount T is large, the response time of the transition in the image display unit 20 may be longer than one frame. This causes a difference to occur between the pixel value (luminance) that the image display unit 20 reaches by the next frame and the pixel value (gradation) stored in the frame memory 30. This difference may lead to a decrease in the calculation accuracy of the flicker component value $F_{DEGREE}$ in the correction processing after the current correction processing. Therefore, the pixel value determination unit 3 is configured to select the pixel value to be used in the correction processing after the current correction processing according to the magnitude of the transition amount T. In other words, depending on the magnitude of the transition amount T, the pixel value determination unit 3 selects whether the pixel value (gradation) to be stored in the frame memory 30 is f(x, y) shown in formula (15) (uncorrected pixel value) or p(x, y) shown in formula (15) (corrected pixel value).

For example, when the pixel value (gradation) to be stored in the frame memory 30 is f(x, y) shown in formula (15), the pixel value used in the image display unit 20 is the corrected pixel value p(x, y), and therefore the pixel value stored in the frame memory 30 and the pixel value used in the image display unit 20 are different.

Conversely, when the pixel value (gradation) to be stored in the frame memory 30 is p(x, y) shown in formula (15), the pixel value stored in the frame memory 30 and the pixel value used in the image display unit 20 are the same.

3. Flow of Obtaining Corrected Pixel Value p

The flow of obtaining corrected pixel value p will be described with reference to FIGS. 6A to 7. In the description of the embodiment, the bitdepth is 8.

Figures 6A, 6B:
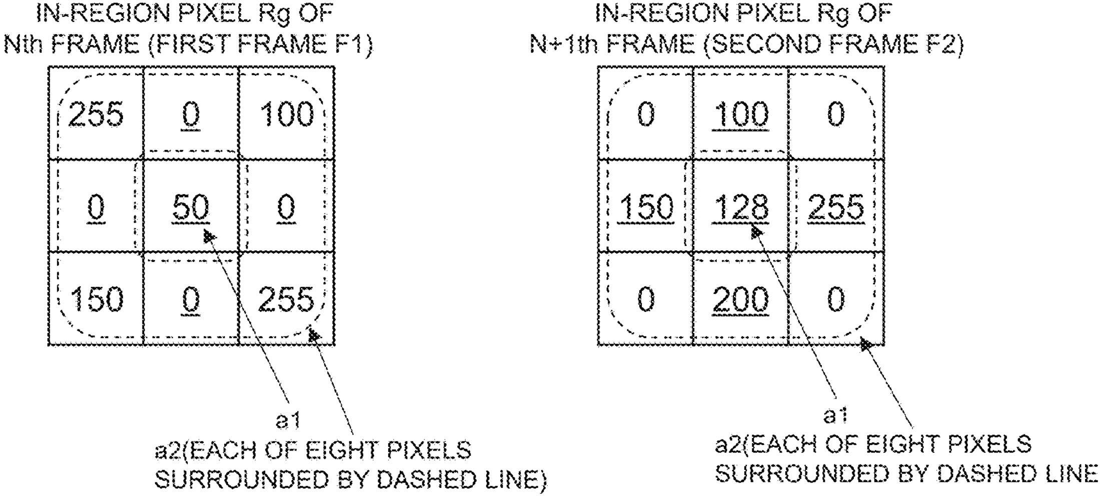
FIGS. 6A and 6B are explanatory diagrams of an example of a method for calculating an increasing value ($R_{SUM}$) of formula (5) and the decreasing value ($F_{SUM}$) of formula (6).

As shown in FIG. 6A, the in-region pixel Rg of the Nth frame corresponding to the frame F1 has an attention pixel a1 arranged at the center and eight surrounding pixels a2 arranged to surround the attention pixel a1. The pixel value of each pixel in the in-region pixel Rg changes from the value shown in FIG. 6A to the value shown in FIG. 6B. For example, the attention pixel a1 increases from 50 to 128. In other words, the attention pixel a1 is an increasing pixel. Furthermore, for example, the four surrounding pixels a2 (pixels with underlined numbers) increase from 0 to 100, 0 to 150, 0 to 255, and 0 to 200. In other words, these four surrounding pixels a2 are also increasing pixels.

The flicker component value $F_{DEGREE}$ is roughly calculated using the formula above.

The first term $((1-|CF_{AVE}-PF_{AVE}|))$ is as follows.

$CF_{AVE}$ is calculated using the values shown in FIG. 6B. $CF_{AVE}=(0\pm100+0+150+128+255+0+200+0)/(3\times3\times255)\fallingdotseq0.36$ $PF_{AVE}$ is calculated using the values shown in FIG. 6A. $PF_{AVE}=(255+0+100+0+50+0+150+0+255)/(3\times3\times255)\fallingdotseq0.35$ Therefore, $(1-|CF_{AVE}-PF_{AVE}|)=(1-|0.36-0.35|)=0.99$ The second term $(\max(R_{SUM}, F_{SUM}))$ is as follows:

$R_{SUM}$ is calculated using the difference between the values of the increasing pixels (pixels with underlined numbers) shown in FIGS. 6A and 6B. $R_{SUM}=(100+150+78+255+200)/(3\times3\times255)=0.34$ $F_{SUM}$ is calculated using the difference between the values of the decreasing pixels (pixels with no underlined numbers) shown in FIGS. 6A and 6B. $F_{SUM}=(255+100+150+255)/(3\times3\times255)\fallingdotseq0.33$ Therefore, $\max(R_{SUM}, F_{SUM})=0.34$ From the above calculation, $F_{DEGREE}=0.99\times0.34\fallingdotseq=0.3$ Next, the transition amount T is calculated. Here, the attention pixel a1 is an increasing pixel. Therefore, according to the condition of formula (13), the transition amount T becomes $T_R$ of formula (11).

From formula (11), $T(=T_R)$ is as follows.

$T=T_R=\mathrm{CLIP}(F_{DEGREE}\times R_{MP}, R_{CLIP})=\mathrm{CLIP}(0.3\times1, 1)=0.3$ Here, $R_{AMP}$ and $R_{CUP}$ are both set to 1.

Then, by substituting the pixel value of the attention pixel a1 in FIGS. 6A and 6B into formula (14), the corrected pixel value p of the attention pixel a1 at the coordinates (x, y) can be obtained.

$$p=128+((128-50)\times0.3)\fallingdotseq151$$

Figure 7:
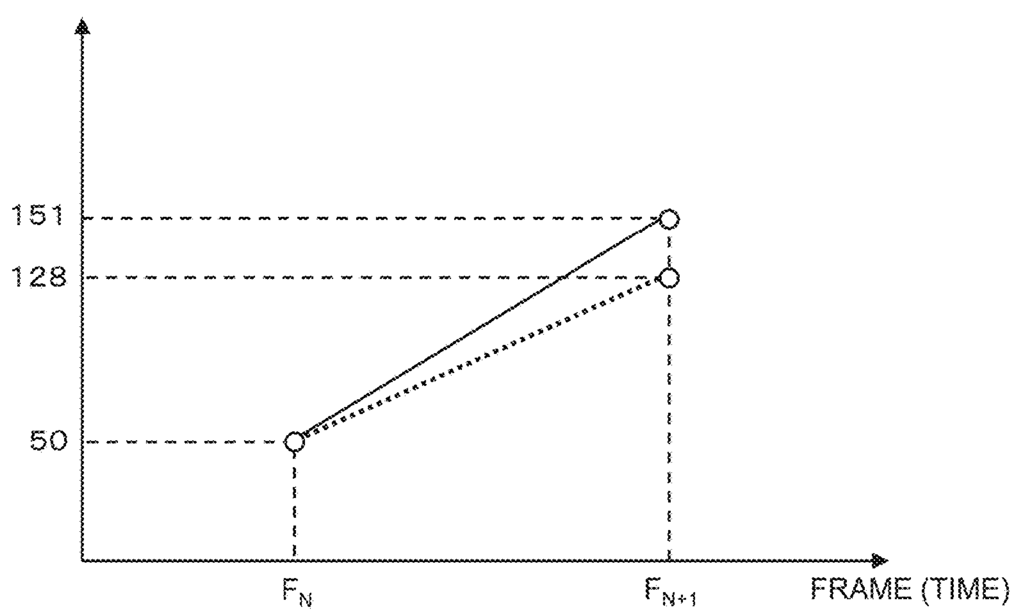
FIG. 7 is an explanatory diagram of the pixel value (corrected pixel value) of the attention pixel a1 in the case where the correction processing is performed on the attention pixel a1 in the frame F2 of the in-region pixel Rg shown in FIG. 6*b*.

In other words, as shown in FIG. 7, the pixel value of the attention pixel a1 in the N+1th frame (the frame F2) is corrected from 128 to 151. In this example, the response speed when the pixel value increases is slower than the response speed when the pixel value decreases, so the overdrive correction processing is performed on the attention pixel a1 where the pixel value increases.

4. Effects of the Embodiment

The pixel value correction unit 2 is configured to obtain the corrected pixel value p based on the flicker component value $F_{DEGREE}$. The flicker component value $F_{DEGREE}$ is based not only on the pixel value of the attention pixel a1 in the frames F1 and F2, but also on the pixel value of the surrounding pixel a2 arranged around the attention pixel a1. In other words, since the flicker component value $F_{DEGREE}$ is a value that takes into account the contents (type) of the frames F1 and F2, the corrected pixel value p is also a value that takes into account the contents of the first and second frames.

For example, when a solid white frame (e.g., the pixel value is maximum) transits to a solid black frame (e.g., pixel value is minimum), flicker is inherently unlikely to occur. Even in such a case, when a technology such as that of Patent Literature 1 is applied uniformly, the response speed of the pixel is unnecessarily reduced, as a result, it may lead to degradation of image quality, such as the appearance of afterimages or the induction of luminance overshoot or undershoot.

In contrast, in the correction processing of the embodiment, when a solid white (the pixel value is 255) frame transits to a solid black (the pixel value is 0) frame, the flicker component value $F_{DEGREE}$ is 0 and the corrected pixel value p is also 0. Therefore, there is no change in the pixel value, and it is possible to avoid unnecessary reduction in pixel response speed and suppress deterioration in image quality.

Furthermore, for frames where flicker is likely to occur, flicker can be suppressed by using the corrected pixel value p as described above in FIGS. 6A to 7. For example, when correction processing is not performed on frames where flicker is likely to occur, such as those in FIGS. 6A and 6B, the area T1 increases as shown in FIG. 5, making flicker more likely to occur. In contrast, in the embodiment, the correction processing reduces the area T1, or the average value of the pixel value shifts so as to protrude upward from the transition line L1, thereby offsetting the area T1 (integral effect). This makes it possible to suppress flicker from occurring.

5. Modifications

5-1. Modification 1: Statistical Values

In the embodiment, the average value of the pixel values of the in-region pixels Rg in the frames F1 and F2 are used as the first statistical value ($PF_{AVE}$) and the second statistical value ($CF_{AVE}$), but it is not limited to this. In place of the average value, the variance value of the in-region pixels Rg in the frames F1 and F2, the median value of the in-region pixels Rg in the frames F1 and F2, or the low-frequency component value of the in-region pixels Rg in the frames F1 and F2 may be used.

It is noted that the low-frequency component value is a weighted value in a probability density distribution according to at least one of an interpixel distance and a pixel value of the in-region pixels Rg.

5-2 MODIFICATION 2: Second Term of Flicker Component Value $F_{DEGREE}$

In the embodiment, $\max(R_{SUM}, F_{SUM})$ is used to calculate the flicker component value $F_{DEGREE}$, but it is not limited to this. Even if $\min(R_{SUM}, F_{SUM})$ is used instead of $\max(R_{SUM}, F_{SUM})$, the same action and effect as in the embodiment can be obtained.

Also, even if a value between $\max(R_{SUM}, F_{SUM})$ and $\min(R_{SUM}, F_{SUM})$ is used instead of $\max(R_{SUM}, F_{SUM})$, the same action and effect as in the embodiment can be obtained. For example, a value corresponding to the average of $R_{SUM}$ and $F_{SUM}$ can be used, such as $\{\max(R_{SUM}, F_{SUM})+\min(R_{SUM}, F_{SUM})\}/2$.

It is also possible to use values that set the specific weight of sensitivity to flicker for $R_{SUM}$ and $F_{SUM}$, such as $(\alpha\times R_{SUM}+\beta\times F_{SUM})/(\alpha+\beta)$ ($\alpha$ and $\beta$ are values greater than or equal to 0).

In this way, the value based on $R_{SUM}$ and $F_{SUM}$ can be used to calculate the flicker component value $F_{DEGREE}$.

5-3 Modification 3: Transition Pixel Value

In the embodiment, when the transition amount T is less than a predetermined threshold, the pixel value determination unit 3 uses the corrected pixel value p as the transition pixel value, but it is not limited to this. For example, the transition pixel value may be the corrected pixel value p obtained in the current correction processing, the pixel value of the attention pixel a1 (the pixel value before correction itself) in the frame F2 of the current correction processing, or a value between these two. It is noted that the value between these two is a value between the corrected pixel value p obtained in the current correction processing and the pixel value of the attention pixel a1 (the pixel value before correction itself) in the frame F2 in the current correction processing.

5-4 Modification 4: Relationship Between Image Processing Unit 10, Etc. And Image Display Unit 20

In the embodiment, the image processing unit 10, the frame memory 30, and the image display unit 20 are described as being integrated (described as being housed in one and the same housing), but it is not limited to this. The image processing unit 10, the frame memory 30, and the image display unit 20 may be separate entities. In other words, the image processing unit 10, the frame memory 30, and the image display unit 20 may be provided in different independent housings.

5-5 Modification 5: Embodiment without Pixel Value Determination Unit 3

Figure 8:
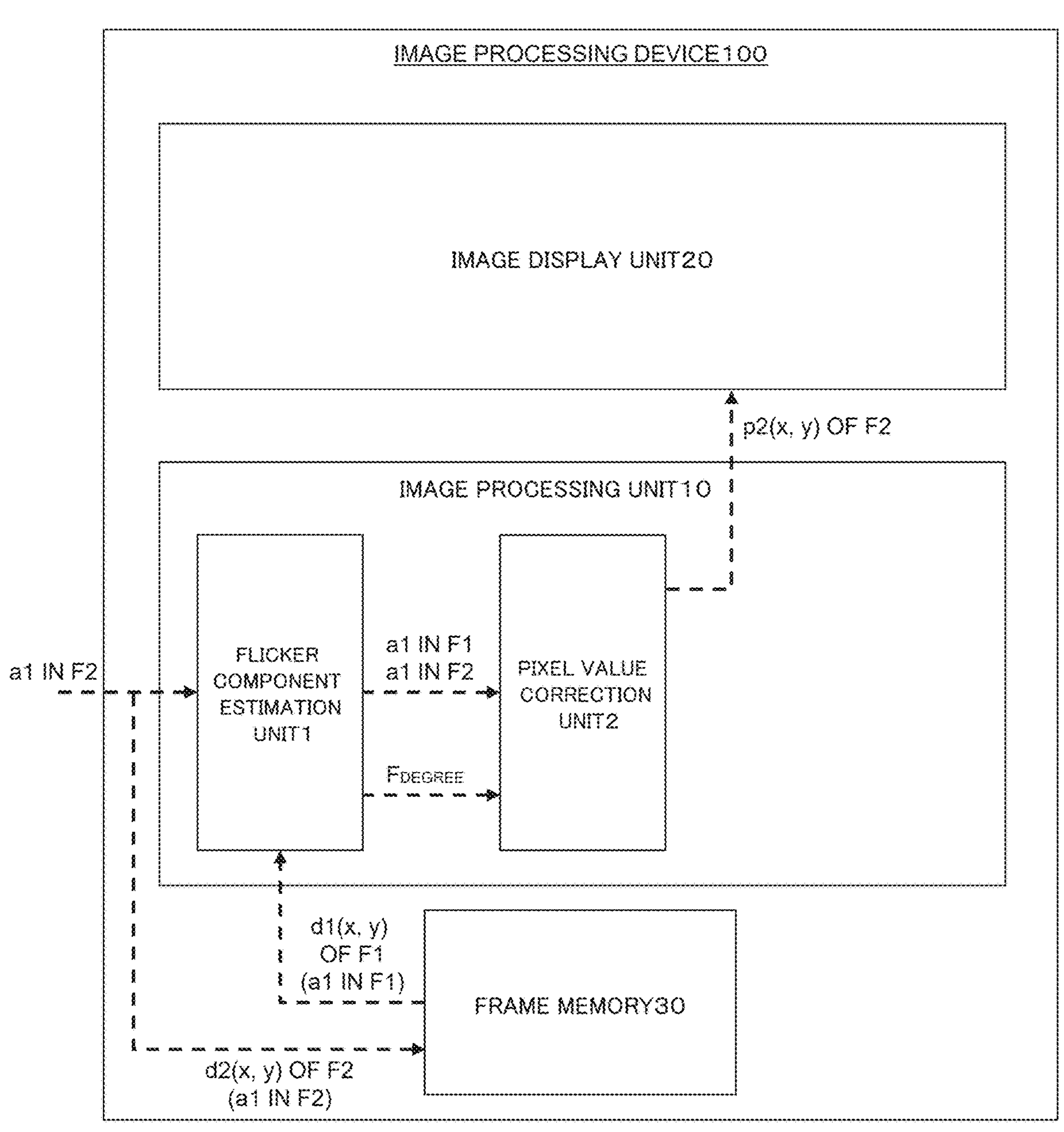
FIG. 8 is a fifth modified example of the image processing device 100 according to the embodiment.

In the embodiment, the image processing device 100 is described as having the pixel value determination unit 3, but the pixel value determination unit 3 is not an essential component. In other words, the image processing device 100 does not have to have the pixel value determination unit 3, as shown in FIG. 8. In this case, the pixel value d1(*x, y*) is not a pixel value determined by the pixel value determination unit 3, but is the pixel value of each frame itself.

For example, as shown in FIG. 8, when the frame F2 is input to the image processing device 100, the frame F2 is output not only to the flicker component estimation unit 1 but also to the frame memory 30 and stored in the frame memory 30. When the flicker component estimation unit 1 calculates the flicker component value $F_{DEGREE}$, the input frame F2 and the frame F1 stored in the frame memory 30 are used.

5-6 Variation 6: Components are Stored in Separate Devices

In the embodiment, the component (the output device 200) that holds the video signal and the component (the image processing device 100) that displays the video signal are described as being separate, but it is not limited thereto, and these components may be integrated.

In the embodiment, the image processing device 100 is described as including an image display unit 20, but it is not limited thereto, and the image processing device 100 does not have to include an image display unit 20.

REFERENCE SIGNS LIST

1: flicker component estimation unit, 2: pixel value correction unit, 3: pixel value determination unit, 10: image processing unit, 20: image display unit, 30: frame memory, 100: image processing device, 200: output device

The invention claimed is:

1. An image processing device that performs a correction processing to correct a second frame based on a first frame and the second frame, comprising:

a flicker component estimation unit comprising a processor, a circuit, or a combination thereof; and a pixel value correction unit comprising a processor, a circuit, or a combination thereof, wherein the flicker component estimation unit is configured to obtain a flicker component value based on pixel values of in-region pixels in the first and second frames, the in-region pixels are composed of a plurality of pixels that are located at same position and are included in a predetermined region in the first and second frames, the plurality of pixels include an attention pixel where a pixel value is to be corrected, and a surrounding pixel arranged around the attention pixel, the flicker component value corresponds to a degree of flicker occurring in an image display unit due to a pixel response delay in the in-region pixels when the first frame transits to the second frame, the pixel response delay corresponds to a response speed of an increasing pixel where a pixel value increases, being slower than or faster than a response speed of a decreasing pixel where a pixel value decreases among the plurality of pixels when the first frame transits to the second frame, the flicker occurs between the first frame and the second frame depending on how pixel values of an area of two or more pixels increase or decrease, the pixel value correction unit is configured to obtain a corrected pixel value based on the flicker component value, and the corrected pixel value is a value obtained by correcting the pixel value of the attention pixel in the second frame.

2. The image processing device of claim 1, wherein the flicker component estimation unit obtains the flicker component value based on a difference between a first statistical value and a second statistical value, the first statistical value is a statistical value of the pixel values of the plurality of pixels of the in-region pixels in the first frame, and the second statistical value is a statistical value of the pixel values of the plurality of pixels of the in-region pixels in the second frame.

3. The image processing device of claim 2, wherein the statistical value is an average value, a variance value, a median value, or a low-frequency component value of the pixel values of the plurality of pixels of the in-region pixels, and the low-frequency component value is a weighted value in a probability density distribution according to at least one of an interpixel distance and a pixel value.

4. The image processing device of claim 1, wherein the flicker component estimation unit obtains the flicker component value based on an increasing value and a decreasing value, the increasing value is based on the pixel value of the increasing pixel among the plurality of pixels when the first frame transits to the second frame, and the decreasing value is based on the pixel value of the decreasing pixel among the plurality of pixels when the first frame transits to the second frame.

5. The image processing device of claim 4, wherein the increasing value is a sum of a difference between the pixel values of the first and second frames in the increasing pixel, and the decreasing value is a sum of a difference between the pixel values of the first and second frames in the decreasing pixel.

6. The image processing device of claim 1, wherein the image processing device further comprises a pixel value determination unit comprising a processor, a circuit, or a combination thereof, the pixel value correction unit is configured to obtain a transition amount based on the flicker component value and obtain the corrected pixel value based on the transition amount, and the pixel value determination unit determines the pixel value of the attention pixel in the first frame used in the correction processing after a current correction processing according to a magnitude of the transition amount.

7. The image processing device of claim 6, wherein when the transition amount is equal to or greater than a predetermined threshold, the pixel value determination unit sets the pixel value of the attention pixel in the first frame used in the correction processing after the current correction processing as the pixel value of the attention pixel in the second frame of the current correction processing, when the transition amount is less than the predetermined threshold, the pixel value determination unit sets the pixel value of the attention pixel in the first frame used in the correction processing after the current correction processing as a transition pixel value, and the transition pixel value is the corrected pixel value obtained in the current correction processing, the pixel value of the attention pixel in the second frame in the current correction processing, or a value between these two.

8. The image processing device of claim 1, wherein the image processing device further comprises an image display unit, and the image display unit is configured to display a frame where the corrected pixel value obtained by the pixel value correction unit is reflected.

9. An image processing method that performs a correction processing to correct a second frame based on a first frame and the second frame that is a frame after the first frame, comprising:

a flicker component estimation step; and a pixel value correction step, wherein in the flicker component estimation step, a flicker component value is obtained based on pixel values of in-region pixels in the first and second frames, the in-region pixels are composed of a plurality of pixels that are located at same position and are included in a predetermined region in the first and second frames, the plurality of pixels include an attention pixel where a pixel value is to be corrected, and a surrounding pixel arranged around the attention pixel, the flicker component value corresponds to a degree of flicker occurring in an image display unit due to a pixel response delay in the in-region pixels when the first frame transits to the second frame, the pixel response delay corresponds to a response speed of an increasing pixel where a pixel value increases, being slower than or faster than a response speed of a decreasing pixel where a pixel value decreases among the plurality of pixels when the first frame transits to the second frame, the flicker occurs between the first frame and the second frame depending on how pixel values of an area of two or more pixels increase or decrease, in the pixel value correction step, a corrected pixel value is obtained based on the flicker component value, and the corrected pixel value is a value obtained by correcting the pixel value of the attention pixel in the second frame.

10. A non-transitory computer readable medium that stores a computer program causing a computer to execute the image processing method of claim 9.

* * * * *